United States Patent [19]
Jonsson

[11] 3,801,214
[45] Apr. 2, 1974

[54] FLUID PRESSURE CREATING ROTARY DEVICE

[76] Inventor: Nils Gunnar Jonsson, 36, Rainbow St., Benoni, South Africa

[22] Filed: Apr. 3, 1972

[21] Appl. No.: 240,411

[52] U.S. Cl............ 415/72, 60/97 P, 74/230.17 F, 192/85
[51] Int. Cl.............................................. F01d 5/00
[58] Field of Search..................... 415/72; 60/97 P

[56] References Cited
UNITED STATES PATENTS

| | | | |
|---|---|---|---|
| 2,411,971 | 12/1946 | MacMillin et al. | 415/72 |
| 2,661,596 | 12/1953 | Winslow | 60/97 P |
| 2,893,688 | 7/1959 | Shada | 415/72 |
| 3,431,855 | 3/1969 | Kazantseu et al. | 415/72 |

Primary Examiner—C. J. Husar
Attorney, Agent, or Firm—Flynn & Frishauf

[57] ABSTRACT

A fluid pressure creating rotary device comprises a member with a circularly cylindrical inner surface and a member with a circularly cylindrical outer surface that cooperates with said inner surface. When the two members rotate relative each other, a shallow groove in one of the two cooperating surfaces brings fluid from a fluid reservoir to an annular pressure groove in one of the members. The pressure of the fluid increases continuously along the transporting groove to the pressure groove from which the pressure can be transmitted through an outlet orifice to a fluid piston or the like which is to be actuated by the pressure fluid. A valving action is achieved simply by having the two cooperating members axially movable relative to each other so that the pressure outlet can be isolated from the pressure groove and connected to a drain chamber. The device is shown as part of a V-belt variator (FIG. 2), and as part of a clutch (FIG. 4 as well as FIG. 7).

22 Claims, 7 Drawing Figures

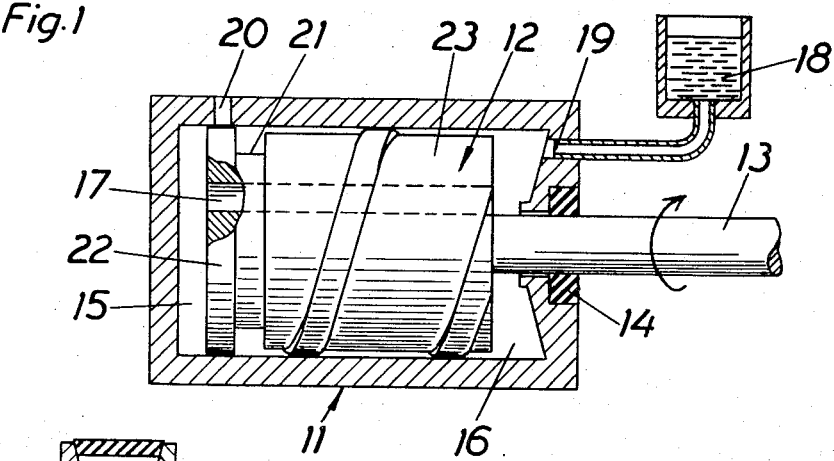
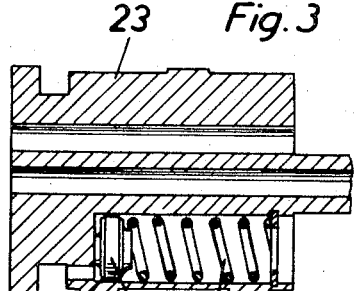
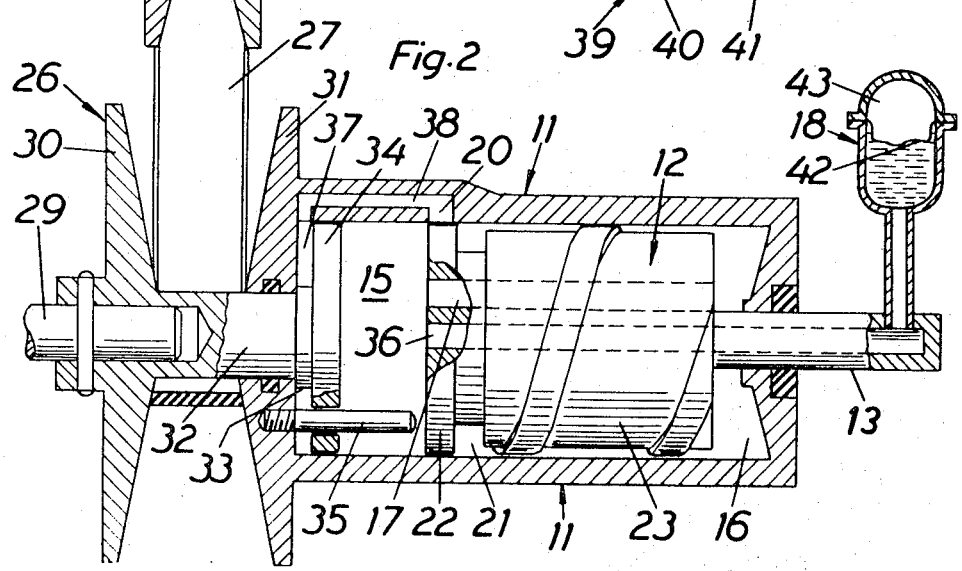

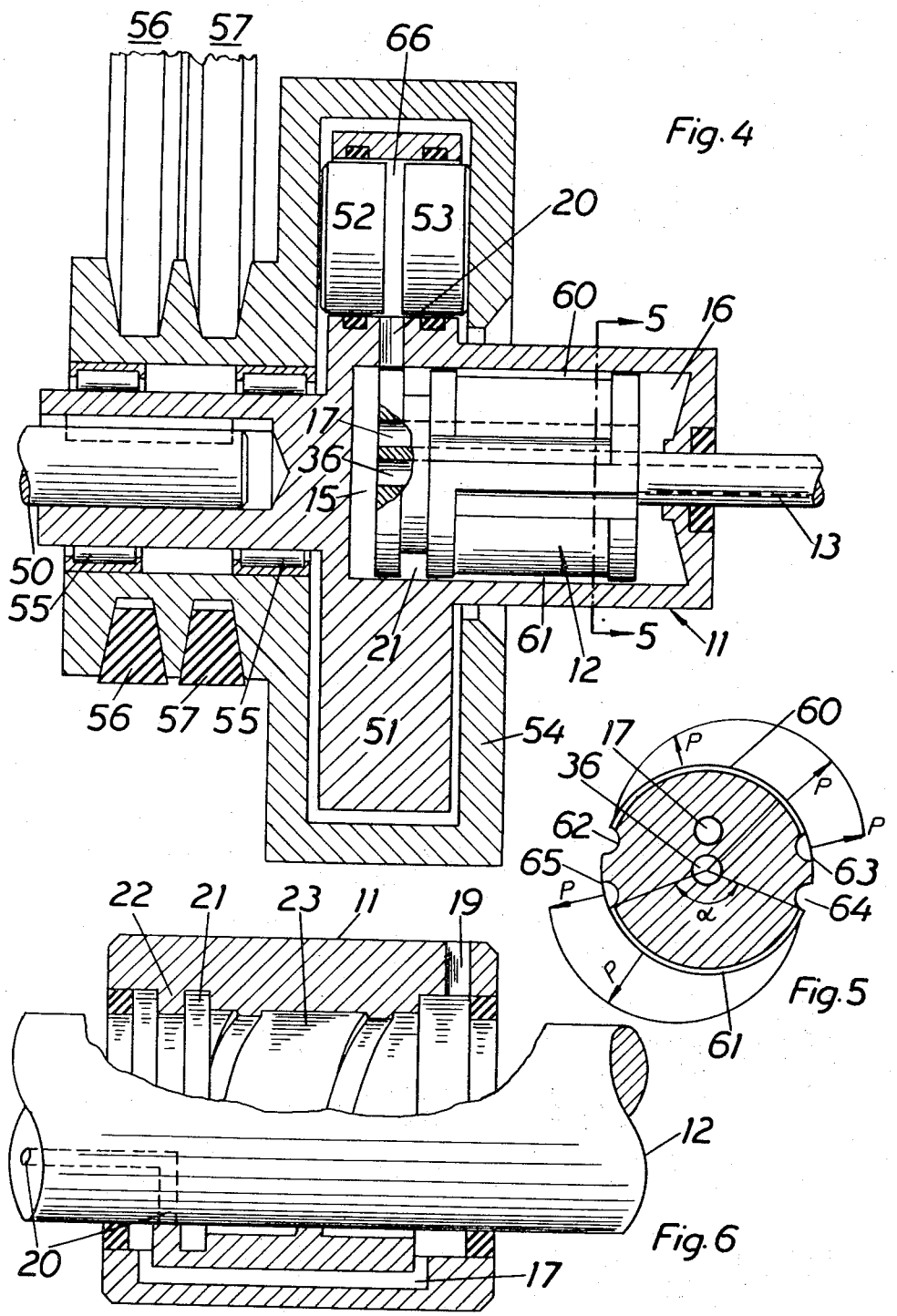

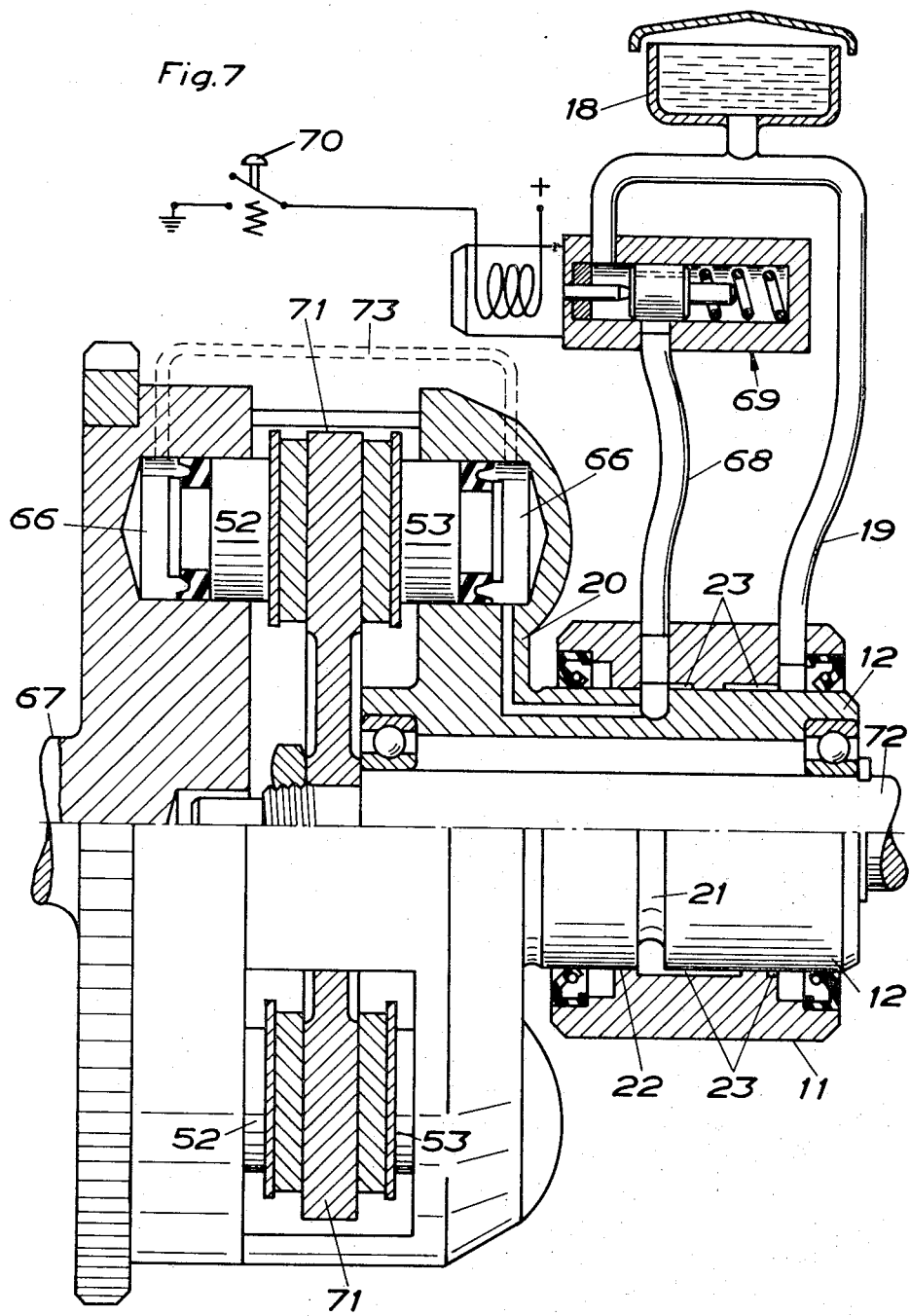

FLUID PRESSURE CREATING ROTARY DEVICE

This invention relates generally to a fluid pressure creating rotary device which comprises a member with a circularly cylindrical inner surface and a member with a circularly cylindrical outer surface that cooperates with said inner surface. When the two members rotate relative each other, a shallow groove in one of the two cooperating surfaces brings fluid from a fluid reservoir to an annular pressure groove in one of the members. The pressure of the fluid increases continuously along the transporting groove to the pressure groove from which the pressure can be transmitted through an outlet orifice to a fluid piston or the like which is to be actuated by the pressure fluid. Such a device can be considered as a pump with a relatively low capacity. The output fluid pressure varies with the rotary speed and such a device in a very simple form can be used instead of a centrifugal regulator for a clutch between an electric motor and a machine or other device driven by the motor.

A build-in valving action can be achieved simply by having the two cooperating members axially movable relative to each other so that the pressure outlet can be isolated from the pressure groove and connected to a drain chamber. The axial movement between the two members can be effected by a very small force since no axial forces between the two members are created during the operation of the device. In this form, the device can be considered as a hydraulic servo valve which, within itself, creates the output fluid pressure. This output pressure can be utilized as a force for operating a positioning motor or the like. Such a servo valve is advantageous when forces are to be imparted to rotating parts of a machine or device such as a clutch, a V-belt variator or the like. Conventionally, in such a case, the force needed is transmitted to the rotating part of the machine either in the form of a pressure fluid supplied through a swivel joint or as a mechanical force transmitted through an axial bearing. When a device in accordance with the invention is utilized the force can be created directly by the rotating part of the machine.

It is an object of the invention to provide a fluid pressure creating rotary device which creates a fluid pressure that varies with the rotary speed, and another object is to provide a device which can be utilized as a servo-valve that, within itself, creates the fluid pressure. More specific objects are to provide a fluid pressure creating device which can be built together with a variator to operate the latter, and to provide a fluid pressure creating device which can be built together with a clutch to operate the clutch.

The invention will be further described with reference to the accompanying drawings in which FIG. 1 is a longitudinal section through a fluid pressure creating device in accordance with the invention; FIG. 2 is a longitudinal section through a V-belt variator in which a fluid pressure creating device in accordance with the invention is integral with one of the two pulleys of the variator and adapted to regulate this pulley; FIG. 3 is a longitudinal section through a detail shown in a view in FIGS. 1 and 2; FIG. 4 is a longitudinal section through a clutch in which a fluid pressure creating device in accordance with the invention is part and adapted for operating the clutch; FIG. 5 is a cross-section along line 5-5 in FIG. 4; FIG. 6 is a longitudinal section through another embodiment of a fluid pressure creating device in accordance with the invention; and FIG. 7 is a longitudinal section through another clutch integral with and operated by a fluid pressure creating device in accordance with the invention. In the various figures, corresponding details have been given corresponding reference numerals.

The device shown in FIG. 1 comprises a stationary cylindrical housing 11 with a circular cross-section, and a cylindrical member 12 which is fastened on a rotating shaft 13 and disposed in the housing 11. A sealing ring 14 seals between the shaft 13 and the housing 11. Between the housing 11 and the cylindrical member 12, there are formed two end chambers 15,16 which are interconnected by means of a duct 17 through the body 12. The chambers 15,16 are filled with oil that is supplied from an oil-reservoir 18, schematically shown, through a supply passage 19 in the housing 11. The housing 11 has an outlet 20 for the pressure fluid and the member 12 has an annular pressure groove 21, one side of which is defined by a sealing ridge 22. A helical transporting groove 23 in the cylindrical surface of the body 12 leads from the end chamber 16 to the pressure groove 21.

When the shaft 13 is rotated as indicated by the arrow in the figure, oil will be brought along the groove 23 into the pressure groove 21 and the pressure increases continuously in the groove 23. The ridge 22 isolates the pressure outlet 20 from the pressure groove 21 when the housing 11 and the member 12 are in the position relative each other shown in the figure. If the non-rotating housing 11 is moved to the right in the figure by means of a non-illustrated actuator, for instance a handle, the pressure outlet 20 will communicate with the pressure groove 21. If instead the housing 11 is moved to the left in the figure, the pressure outlet 20 will drain through the chamber 15, the duct 17, the chamber 16 and the supply passage 19 to the reservoir 18. Since the pressure in the two end chambers 15,16 is equal, only a small force will be needed for effecting the movement of the housing 11 between the various axial positions. If the described valving action is not needed, the member 12 and the housing 11 can be axially fixed relative to each other with the pressure outlet 20 registering with the pressure groove 21.

The variator shown in FIG. 2 has a spring biased variable pulley 25 which is connected with another variable pulley 26 by means of a V-belt 27. The variable pulleys 25,26 are connected to be conjointly rotated with rotatable shafts 28,29, respectively, and the variator provides for a variable gearing rate between the shafts. The pulley 26 has one, 30, of its flanges 30,31 attached to the shaft 29 so that this flange is axially fixed with respect to a non-illustrated supporting frame.

A piston 34 and a shaft 32 with a shoulder 33 are integral with the flange 30. The other, 31, of the flanges 30,31 of the pulley 26 is axially slidable on the shaft 32 and it is forced to conjointly rotate with the flange 30 by means of a pin 35. A cylindrical housing 11, corresponding to the housing 11 in FIG. 1, is rigidly connected to the flange 31 and it rotates therefore conjointly with the entire pulley 26. Inside the housing 11, there is a cylindrical member 12 which corresponds to the member 12 in FIG. 1 but in this embodiment it is non-rotating. The details of the cylindrical member 12 and the housing 11 have been given the same reference numerals as in FIG. 1 and these details are therefore not described again. Since the member 12 is not rotatable, the fluid reservoir 18 is connected to the chamber 16 through a duct 36 in the shaft 13 and the member 12 instead of in the housing 11. The piston 34 separates the chamber 15 from a chamber 37 and the pressure outlet 20 is connected to this chamber 37 by means of a duct 38.

If the non-rotating shaft 13 and thereby the body 12 is moved to the left in FIG. 2 from its illustrated position in which the flange 31 abuts the shoulder 33 and if it is arrested in the new position, oil will flow from the pressure groove 21 through the pressure outlet 20 and the duct 38 to the chamber 37. As a result, the housing 11 will follow to the left in the figure until the pressure outlet 20 again will only just be closed by the sealing ridge 22. Since there is normally a small leakage from the chamber 37 around the piston 34 and around the pin 35 into the chamber 15, the housing 11 will automatically take up the position that gives a corresponding bleed from the pressure groove 21 to the pressure outlet 20 i.e., to the pressure chamber 37. Every axially fixed position of the shaft 13 with respect to the flange 30 i.e., with respect to the non-illustrated frame, will result in a definite position of the housing 11 and thereby a definite width of the pulley 26; a servo effect of automatically following. Since there is only a small flow through the transporting groove 23, there will be a time delay between input and output i.e., between the axial control movement of the shaft 13 and the resulting axial movement of the housing 11. For effecting a faster action, an accumulator 39 can be located in the body 12 as shown in FIG. 3. The accumulator comprises a piston 40 and a spring 41 and it is connected to the pressure groove 21. Since there is no consumption of oil in connection with this device, shown in FIG. 2, the oil reservoir 18 can be closed with a flexible membrane 42 which separates the oil chamber of the reservoir from a gas filled closed chamber 43. Thus, the hydraulic system will be a closed system.

The clutch shown in FIG. 4 has a drive member 51 which is rotated by an input shaft 50 and has three pairs of pistons 52,53 that serve as shoes for releasable frictional engagement with a driven member 54 journal-mounted by means of a roller bearing 55 on the drive member 51. The driven member 54 is formed as a pulley for two V-belts 56,57. The drive member 51 is formed as a housing 11 for a non-rotating cylindrical member 12 which has ducts 17,36 like the member 12 in FIG. 3. However, the member 12 in FIG. 4 has two wide transporting grooves 60,61 instead of the helical transporting groove 23 in FIG. 2. The transporting groove 60 takes oil from an axial inlet groove 62 that leads from the chamber 16 and it delivers oil into an axial outlet groove 63 that leads to the pressure groove 21. In the same way the transporting groove 61 takes oil from an inlet groove 64 and delivers oil to an outlet groove 65. The winding angle of the groove 61 has been marked out in FIG. 5 as α. The oil pressure builds up in the transporting grooves 60,61 as can be seen diagrammatically in FIG. 5. The pressure is referred to as P in FIG. 5 and as can be seen from the FIGS. 4 and 5 the cylindrical member 12 is balanced with respect to radial forces.

If a cylindrical member 12 with helical transporting grooves of the type shown in FIGS. 1–3 is provided with two transporting grooves which are spaced angularly 180° with respect to each other, such a cylindrical member can be balanced radially too. However, this balanced form is not illustrated. The flow created and the pressure of the flow can be varied by varying the width, depth and angle of the transporting grooves and by using fluids with different viscosity. A helical transporting groove can have a winding angle greater than 360° and it can therefore give higher pressure than the grooves 60,61 in FIGS. 4 and 5. It is suitable to use a fluid with a viscosity that is very little effected by the temperature as, for instance, some silicone oils. The depth of the transporting groove can for instance be between 0.1 and 0.5 mm when a silicone oil is used.

The pressure chamber 66 between each pair of the pistons 52,53, FIG. 4, is connected to a pressure outlet 20. When the cylindrical member 12 is in a position to the right of the illustrated axial position, the pressure chambers 66 are drained through the pressure outlets 20 to the chamber 15 and through the duct 36 to the oil reservoir 18. If, by means of the non-rotatable shaft 13, the cylindrical member 12 is moved to the left in the figure, the pressure outlet 20 will instead communicate with the pressure groove 21 so that the pistons 52,53 will be pressed into frictional engagement with the member 54 and the clutch is engaged.

In the device shown in FIG. 6, the rotating shaft 12 has a surface without any grooves. The pressure outlet 20 is in the shaft 12 whereas the transporting groove 23, the pressure groove 21 and the sealing ridge 22 are in the sleeve 11.

In FIG. 7, a clutch is shown which can be utilized in vehicles, for instance in cars or trucks. The output shaft 67 of the motor rotates the cylindrical member 12 with the pressure groove 21. The non-rotating sleeve 11 with the transporting groove 23 bears on the member 12. It is not axially movable with respect to the sleeve. The pressure groove 21 in the member 12 is connected to the pressure chamber 66 of the pistons 52,53, but it is also connected to by-pass conduit 68 which over a solenoid valve 69 can be connected to the oil reservoir 18 and the supply passage 19. The solenoid valve 69 is controlled by a switch 70 which can be associated with the gear shift of the vehicle so as to be operated either automatically or manually. The clutch is designed as a conventional disc brake with a number of pairs of shoes operated by means of pistons 52,53. The pressure chambers 66 of the pistons 52,53 are interconnected through a schematically shown passage 73. The disc 71 of the clutch is fixedly mounted on the output shaft 72 of the clutch. When the switch 70 is closed, the solenoid valve 69 opens to drain the pressure groove 21 and the fluid pressure chambers 66 so that the clutch releases. A soft engagement of the clutch will be provided for independently of the skill of the operator or driver. Furthermore, the clutch will connect and disconnect in response to the rotary speed since no or little pressure is created at idle speed. As the rotary speed increases the fluid pressure increases and the clutch engages. The clutch shoes can be spring biased towards the disengaged position in order to improve the disengagement of the clutch and an adjustable restrictor can be connected between the conduits 68 and 19 to permit an adjustment of the engagement of the clutch.

I claim:

1. A fluid pressure creating rotary device comprising:

a first member with a circularly cylindrical inner surface,
a second member with a circularly cylindrical outer surface that cooperates with said inner surface, means for moving one of said members with respect to the other, said moving means including means for rotating one of said members with respect to the other, an annular collecting groove in one of said cylindrical surfaces, a pressure outlet connected to the collecting groove, a shallow transporting groove disposed in the cylindrical surface of one of said members, said transporting groove being adjacent the cylindrical surface of the other of said members and having an inlet connected to a fluid reservoir, and an outlet connected to the collecting groove, said transporting groove being disposed in said cylindrical surface of one of said members such that the geometrical projections of its inlet and outlet on a plane perpendicular to the axis of rotation are angularly spaced relative to each other and being dimensioned so that said fluid will be brought along the transporting groove from the fluid reservoir to the pressure groove during rotation of the rotatable one of the two members by virtue of the friction of said fluid against the cylindrical wall that is adjacent said transporting groove in combination with the internal friction of said fluid.

2. A device as claimed in claim 1 in which said transporting groove is a helical groove.

3. A device as claimed in claim 1, in which the collecting groove is in one of the cooperating members and the pressure outlet in the other, and the two cooperating members are axially movable relative to each other between a position in which the pressure outlet communicates with the collecting groove and a position in which the pressure outlet is isolated from the collecting groove.

4. A device as claimed in claim 3 in which a ridge on the one of the members that is provided with the collecting groove separates the collecting groove from a drain chamber and is capable of isolating the collecting groove from the pressure outlet, said two cooperating members being capable of taking up an axial position relative to each other in which the pressure outlet communicates with the drain chamber.

5. A device as claimed in claim 4, in which the two cooperating members form a fluid chamber at the inlet portion of the transport groove, said fluid chamber and said drain chamber being interconnected and one of them being connected to the fluid reservoir.

6. A device as claimed in claim 5, in which the two cooperating members are axially movable relative to each other into a position in which the pressure outlet communicates with said drain chamber.

7. A device as claimed in claim 6, in which an accumulator is connected to the collecting groove.

8. A device as claimed in claim 7, in which said accumulator is spring-loaded and disposed inside said second member.

9. A device as claimed in claim 4, in which said rotating means includes a variable pulley of a variator, said variable pulley having a flange affixed to one of said first and second cooperating members.

10. A device as claimed in claim 9, in which said variable pulley has an axially movable flange and an axially fixed flange, said first member being affixed to said axially movable flange of the pulley, and said second member being axially adjustable with respect to said axially fixed flange, said moving means further including a positioning motor coupled to said pressure outlet for axially moving said first member.

11. A device as claimed in claim 10, in which said positioning motor comprises a piston-cylinder device whose piston is affixed to the axially fixed flange.

12. A device as claimed in claim 1, in which said rotating means includes a friction clutch coupled to said first and second members, one of said first and second cooperating members being adapted to rotate conjointly with an input shaft of the clutch, the pressure outlet being connected to a pressure chamber for a piston that effects the engagement and disengagement moments of the clutch.

13. A device as claimed in claim 12, in which the two cooperating members are in an axially fixed position relative to each other so that the pressure groove is constantly communicating with the pressure outlet, and including a drain conduit controlled by a shut-off valve to selectively drain the pressure outlet.

14. A device as claimed in claim 13, in which said drain conduit is connected to the fluid reservoir.

15. A device as claimed in claim 13, in which said valve is an electromagnetic valve.

16. A device as claimed in claim 15, in which said valve is controlled by means of an electric switch disposed on the gear shift of a vehicle of which the clutch is part.

17. A device as claimed in claim 12, in which the collecting groove is in one of the cooperating members and the pressure outlet in the other, and the two cooperating members are axially movable relative to each other between a position in which the pressure outlet communicates with the collecting groove and a position in which the pressure outlet is isolated from the collecting groove.

18. A device as claimed in claim 17, in which a ridge on the one of the members that is provided with the collecting groove separates the collecting groove from a drain chamber and is capable of isolating the collecting groove from the pressure outlet, said two cooperating members being capable of taking up an axial position relative to each other in which the pressure outlet communicates with the drain chamber.

19. A device as claimed in claim 18, in which the two cooperating members form a fluid chamber at the inlet portion of the transport groove this fluid chamber and said drain chamber being interconnected and one of them being connected to the fluid reservoir.

20. A device as claimed in claim 1, in which said fluid is oil.

21. A device as claimed in claim 20, in which said transporting groove has a depth of between 0.1 and 0.5 mm.

22. A device as claimed in claim 1, in which said transporting groove has a depth of between 0.1 and 0.5 mm.

* * * * *